United States Patent
Kumar et al.

(10) Patent No.: US 11,237,988 B2
(45) Date of Patent: Feb. 1, 2022

(54) BLOCKING INDIVIDUAL INTERFACES OF USB COMPOSITE DEVICES

(71) Applicant: Dell Products L.P., Round Rock, TX (US)

(72) Inventors: Ankit Kumar, Deoghar (IN); Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/583,422

(22) Filed: Sep. 26, 2019

(65) Prior Publication Data
US 2022/0004508 A1    Jan. 6, 2022

(51) Int. Cl.
*G06F 12/14* (2006.01)
*G06F 13/38* (2006.01)
*G06F 13/42* (2006.01)

(52) U.S. Cl.
CPC ........ *G06F 12/1483* (2013.01); *G06F 13/382* (2013.01); *G06F 13/4282* (2013.01); *G06F 2213/0042* (2013.01)

(58) Field of Classification Search
CPC ............. G06F 12/1483; G06F 13/382; G06F 13/4282; G06F 2213/0042
See application file for complete search history.

(56) References Cited

U.S. PATENT DOCUMENTS

| | | | | |
|---|---|---|---|---|
| 7,577,765 B2* | 8/2009 | Bhesania | ............... | G06F 9/4411 710/10 |
| 8,332,846 B2* | 12/2012 | Astrand | ............... | G06F 9/45537 718/1 |
| 2002/0143921 A1* | 10/2002 | Stephan | ............... | G06F 13/4081 709/223 |
| 2009/0019192 A1* | 1/2009 | Yeh | ........................ | G06F 13/426 710/52 |
| 2019/0050607 A1* | 2/2019 | Halim | .................. | G06F 13/4282 |

OTHER PUBLICATIONS

S. Kaul, P. Maheta, R. J. Rajesh and R. R. Das, "Novel multi-interface USB prototype device for merging commonly used peripheral devices," 2015 International Conference on Industrial Instrumentation and Control (ICIC), 2015, pp. 17-22, doi: 10.1109/IIC.2015.7150584. (Year: 2015).*

* cited by examiner

*Primary Examiner* — Eric T Oberly
(74) *Attorney, Agent, or Firm* — Kirton McConkie; Brian Tucker (57) ABSTRACT

Individual interfaces of USB composite devices can be blocked. When a USB device is connected to a host system, a filter driver can be loaded on top of the USB hub driver and can be configured to monitor I/O control (IOCTL) requests that are sent as part of the enumeration process. When the filter driver detects that the USB device is a USB composite device, it can selectively modify the descriptors that the USB composite device reports based on the number of interfaces that will not be blocked. This selective modification of the descriptors enables individual interfaces to be blocked without filtering the USB composite class driver which in turn minimizes or eliminates any conflicts that may otherwise exist.

20 Claims, 9 Drawing Sheets

BLOCKING INDIVIDUAL INTERFACES OF USB COMPOSITE DEVICES

CROSS-REFERENCE TO RELATED APPLICATIONS

N/A

BACKGROUND

When a USB device is connected to a host system (e.g., a desktop, laptop or thin client computer), the operating system (or other software) on the host system queries the USB device for its descriptors. The USB specification defines a number of standard requests for this purpose. There are various types of descriptors including device descriptors, configuration descriptors, interface descriptors and endpoint descriptors among others.

These descriptors are arranged hierarchically. In particular, each USB device has a single device descriptor which identifies one or more configuration descriptors. Each configuration descriptor may identify one or more interface descriptors. Similarly, each interface descriptor may identify one or more endpoint descriptors.

The device descriptor represents the entire device and identifies, among other things, the device's class, vendor ID, product ID and the number of configurations the device has. Each configuration descriptor identifies, among other things, power characteristics and the number of interfaces the configuration has. Each interface descriptor identifies, among other things, the number of endpoints the interface has. Finally, each endpoint descriptor identifies, among other things, the endpoint transfer type and maximum packet size.

A USB composite device is a USB device that has multiple interfaces—e.g., it has at least one configuration descriptor that identifies multiple interface descriptors. The following is an example of a portion of the descriptors for a composite USB webcam (Microsoft LifeCam VX-5000):

Device Descriptor:
   bcdUSB: 0x0200
   bDeviceClass: 0xEF
   bDeviceSubClass: 0x02
   bDeviceProtocol: 0x01
   bMaxPacketSize0: 0x40 (64)
   idVendor: 0x045E (Microsoft Corporation)
   idProduct: 0x0728
   bcdDevice: 0x0100
   iManufacturer: 0x01
   0x0409: "Microsoft"
   iProduct: 0x02
   0x0409: "Microsoft LifeCam VX-5000"
   0x0409: "Microsoft LifeCam VX-5000"
   iSerialNumber: 0x00
   bNumConfigurations: 0x01
   Configuration Descriptor:
   wTotalLength: 0x02CA
   bNumInterfaces: 0x02
   bConfigurationValue: 0x01
   iConfiguration: 0x00
   bmAttributes: 0x80 (Bus Powered)
   MaxPower: 0xFA (500 mA)
     Interface Descriptor:
     bInterfaceNumber: 0x00
     bAlternateSetting: 0x00
     bNumEndpoints: 0x01
     bInterfaceClass: 0x0E
     bInterfaceSubClass: 0x02
     bInterfaceProtocol: 0x00
     iInterface: 0x02
     0x0409: "Microsoft LifeCam VX-5000"
     0x0409: "Microsoft LifeCam VX-5000"
       Endpoint Descriptor:
       bEndpointAddress: 0x82 IN
       bmAttributes: 0x01
       wMaxPacketSize: 0x0080 (128)
       bInterval: 0x01
     Interface Descriptor:
     bInterfaceNumber: 0x01
   . . .

In this example, the configuration descriptor indicates that the webcam has two interfaces (bNumInterfaces=0x02). The first interface descriptor shown defines the first of these two interfaces (bInterfaceNumber=0x00) and indicates that the interface has a single isochronous endpoint (bmAttributes=0x01). For brevity, the full content of the second interface descriptor is not shown.

Figure 1:
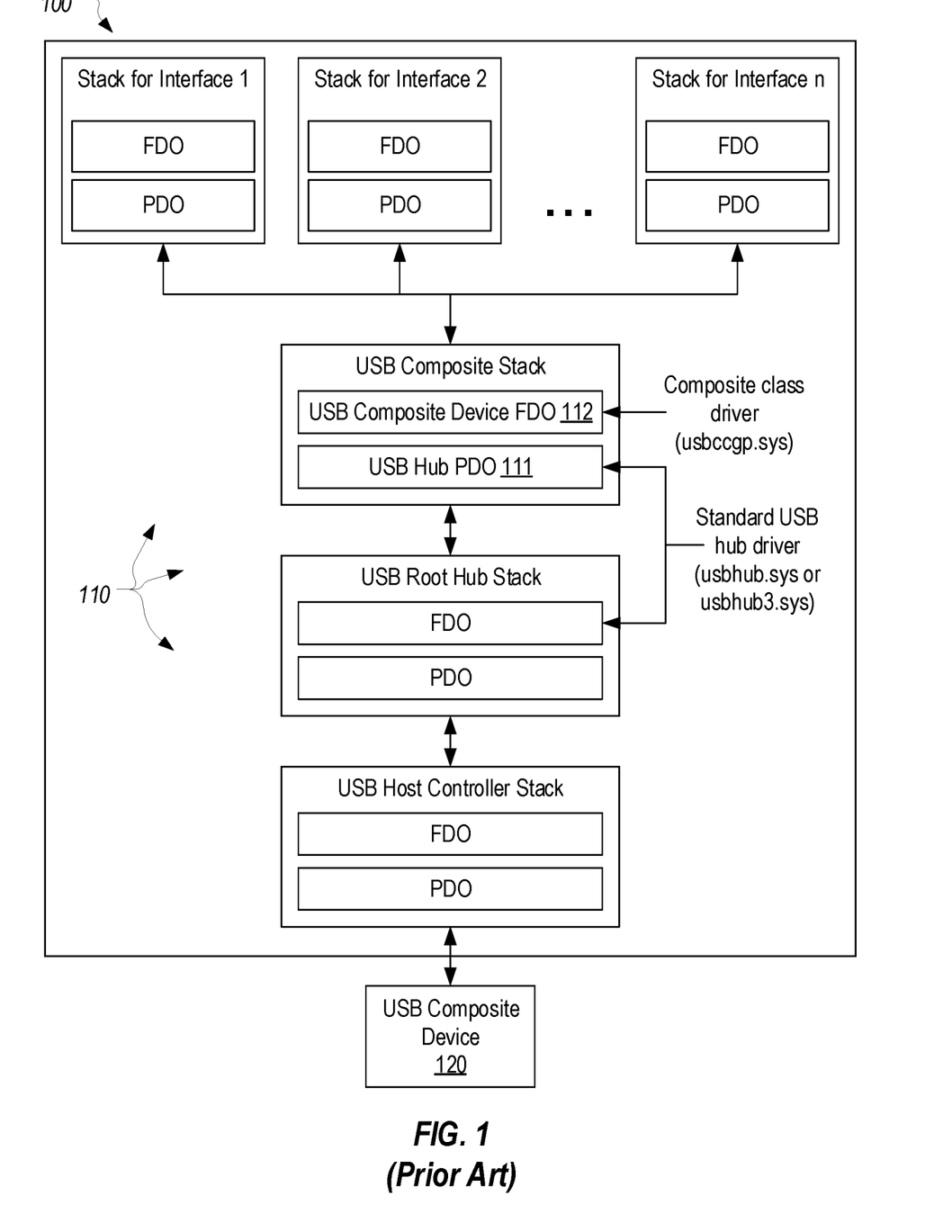
FIG. 1, which represents prior art, illustrates an example USB device stack that may be loaded on a host system when a USB composite device is connected to the host system.

FIG. 1 illustrates an example USB device stack 110 that may be loaded on a host system 100 when a USB composite device 120 is connected to host system 100. In accordance with the Windows operating system, USB device stack 110 is formed of a number of physical device objects (PDOs) and functional device objects (FDOs). As one of skill in the art understands the role and function of these device objects, a full description will not be provided. Suffice it to say that there is typically a physical device object and a functional device object for each driver and therefore, for purposes of this description, the terms device object and driver can be viewed as synonymous. Additionally, such terms should be construed as encompassing the equivalent components/terminology employed in other operating systems such as Linux.

USB device stack 110 includes the USB host controller stack and the USB root hub stack. These device stacks would be loaded for virtually any USB device, whether simple or composite. Additionally, because the connected device is USB composite device 120, a USB composite stack will be loaded which includes USB Hub PDO 111 and USB composite device FDO 112. As indicated, in a Windows environment, USB hub PDO 111 can be the PDO for the standard USB hub driver usbhub.sys or usbhub3.sys (or the equivalent driver in other operating systems), while USB composite device FDO 112 can be the FDO for the USB composite class driver usbccgp.sys (or the equivalent driver in other operating systems). USB device stack 110 also represents that a device stack may be created for each interface of the USB composite device.

It is oftentimes desirable to block access to USB devices or select types of USB devices. For example, to prevent data theft or misuse, an administrator may configure employees' computers to block access to mass storage devices. Various solutions exist for accomplishing this. For example, the Windows operating system provides group policies that can be set to block read or write access to all removable storage. Other solutions may be configured to prevent a device stack from being loaded when a blocked USB device is connected.

For simple USB devices, i.e., non-composite USB devices, the existing solutions for blocking access are generally sufficient. However, USB composite devices present unique difficulties. For example, it may be desired to block individual interfaces of the USB composite device rather than blocking the entire device. Although there are solutions that are capable of blocking individual interfaces of a USB composite device (e.g., by filtering the USB composite class driver (usbccgp.sys), these solutions have proven unsatisfactory. This is particularly true when the host system may include components (e.g., filter(s) in the device stack) for redirecting USB devices since the blocking solution creates conflicts with the redirection solution. Such conflicts oftentimes result in the hanging of the keyboard or mouse, plug-and-play deadlock, blue screen of death from multiple filters resetting the device and other issues.

BRIEF SUMMARY

The present invention extends to methods, systems, and computer program products for blocking individual interfaces of USB composite devices. When a USB device is connected to a host system, a filter driver can be loaded on top of the USB hub driver and can be configured to monitor I/O control (IOCTL) requests that are sent as part of the enumeration process. When the filter driver detects that the USB device is a USB composite device, it can selectively modify the descriptors that the USB composite device reports based on the number of interfaces that will not be blocked. This selective modification of the descriptors enables individual interfaces to be blocked without filtering the USB composite class driver which in turn minimizes or eliminates any conflicts that may otherwise exist.

In one embodiment, the present invention is implemented by a filter as a method for blocking individual interfaces of USB composite devices. The filter receives a first request sent by a USB composite driver to a USB hub driver and determines that the first request is a request for a configuration descriptor of a USB device. The filter receives a response to the first request from the USB hub driver. The response includes the configuration descriptor of the USB device. The filter determines that one or more interfaces defined in the configuration descriptor should be blocked and modifies the configuration descriptor by removing the one or more interfaces from the configuration descriptor. The filter then passes the response with the modified configuration descriptor to the USB composite driver.

In another embodiment, the present invention is implemented as computer storage media storing computer executable instructions which when executed implement a method for blocking individual interfaces of USB composite devices. This method includes: attaching a filter device object to a USB hub physical device object; receiving, at the filter device object, a USB request block that targets the USB hub physical device object and that requests a configuration descriptor of a USB device; causing, by the filter device object, the USB request block to be provided to the filter device object after the USB hub physical device object has obtained the configuration descriptor of the USB device; obtaining, at the filter device object, the configuration descriptor of the USB device from the USB request block; determining that one or more interfaces defined in the configuration descriptor should be blocked; modifying the configuration descriptor by removing the one or more interfaces from the configuration descriptor; and passing, by the filter, the USB request block with the modified configuration descriptor to a USB composite driver.

In another embodiment, the present invention is implemented by a filter as a method for blocking individual interfaces of USB composite devices. The filter receives a response from a USB hub driver. The response includes a configuration descriptor of a USB device. The response targets a USB composite driver. The filter determines that one or more interfaces defined in the configuration descriptor should be blocked and modifies the configuration descriptor by removing the one or more interfaces from the configuration descriptor. The filter then passes the response with the modified configuration descriptor to the USB composite driver.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "host system" should be construed as any USB-compatible computing device including desktops, laptops, tablets, thin clients, zero clients, smart phones, televisions, etc. The term "USB composite device" should be given its ordinary definition—e.g., a USB device that includes more than one interface. The term "filter" should be construed as encompassing any components that are capable of performing the functionality described below (e.g., a filter driver and corresponding filter device object in Windows implementations, a module that implements the filtering in Linux, etc.). Embodiments of the present invention will be described using Windows-based examples. However, the present invention could equally be implemented on host systems running other operating systems or control software.

Figure 2:
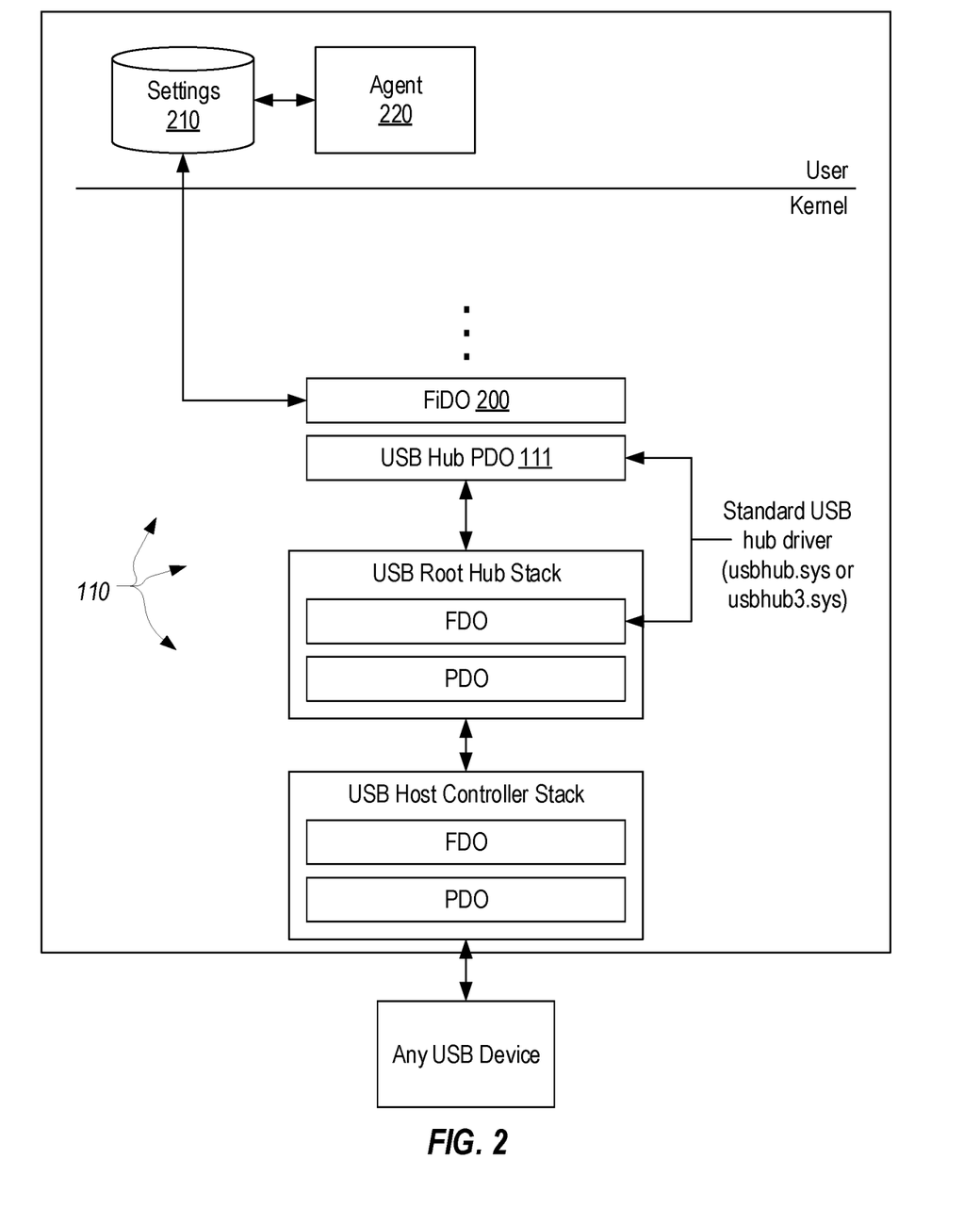
FIG. 2 illustrates an example USB device stack which includes a filter device object (or filter driver) that is configured to implement aspects of the present invention.

FIG. 2, which is based on FIG. 1, illustrates an example USB device stack which includes a filter device object (FiDO) 200 (which is an example of a "filter") that is configured to implement aspects of the present invention. As shown, FiDO 200 is loaded on top of USB hub PDO 111. In other words, FiDO 200 (or the corresponding filter driver) filters the standard USB hub driver. Accordingly, FiDO 200 can be configured to be loaded as an upper filter driver on device stack 110 whenever USB hub PDO 111 is loaded.

FIG. 2 represents that FiDO 200 can be loaded prior to the loading of the higher level device objects. More particularly, because FiDO 200 is loaded on top of USB hub PDO 111, it will be loaded during the enumeration process before any class of device-specific device objects are loaded. This enables FiDO 200 to determine, during enumeration, whether the connected USB device is a USB composite device. Notably, if the connected USB device is a USB composite device, FiDO 200 would be positioned below USB composite device FDO 112.

FIG. 2 also shows that settings 210 may be maintained on host system 210. Settings 210 can define which interfaces are allowed on host system 210. Settings 210 could be in the form of policies that block particular interfaces based on various criteria such as the identity of the user, hardware configurations, software configurations, time of day, location, etc. An agent 220 may also be employed on host system 100. Agent 220 may communicate with a management server, a local user interface or any other mechanism for receiving updates to settings 210. Agent 220 may also provide an interface to enable a local and/or remote administrator to communicate with FiDO 200. Although not shown, a control device object may be loaded to facilitate such communications. As one example only, agent 220 (or another user-mode component) could send a request to cycle or reset the USB port that USB hub PDO 111 manages based on some event (e.g., an update to settings 210, particular types of configuration changes on host system 100, etc.). Such a request could be sent directly to FiDO 200 using a control device object as opposed to passing the request down the stack.

FIGS. 3A-3D represent how FiDO 200 can determine whether a connected USB device is a USB composite device. In these figures and the following description, it is assumed that the device enumeration process has proceeded to the point that USB hub PDO 111, FiDO 200 and USB composite device FDO 112 have been loaded. It will also be assumed that the USB composite class driver that USB composite device FDO 112 represents is tasked with enumerating the interfaces of a USB composite device and causing a corresponding stack to be loaded for each interface. It is noted, however, that USB composite device FDO 112 can represent any device object and does not necessarily correspond with the generic USB composite class driver (usbccgp.sys). For example, USB composite device FDO 112 could represent a vendor-specific driver. The present invention should therefore not be limited by any device object or driver that may be positioned above FiDO 200.

Figure 3A:
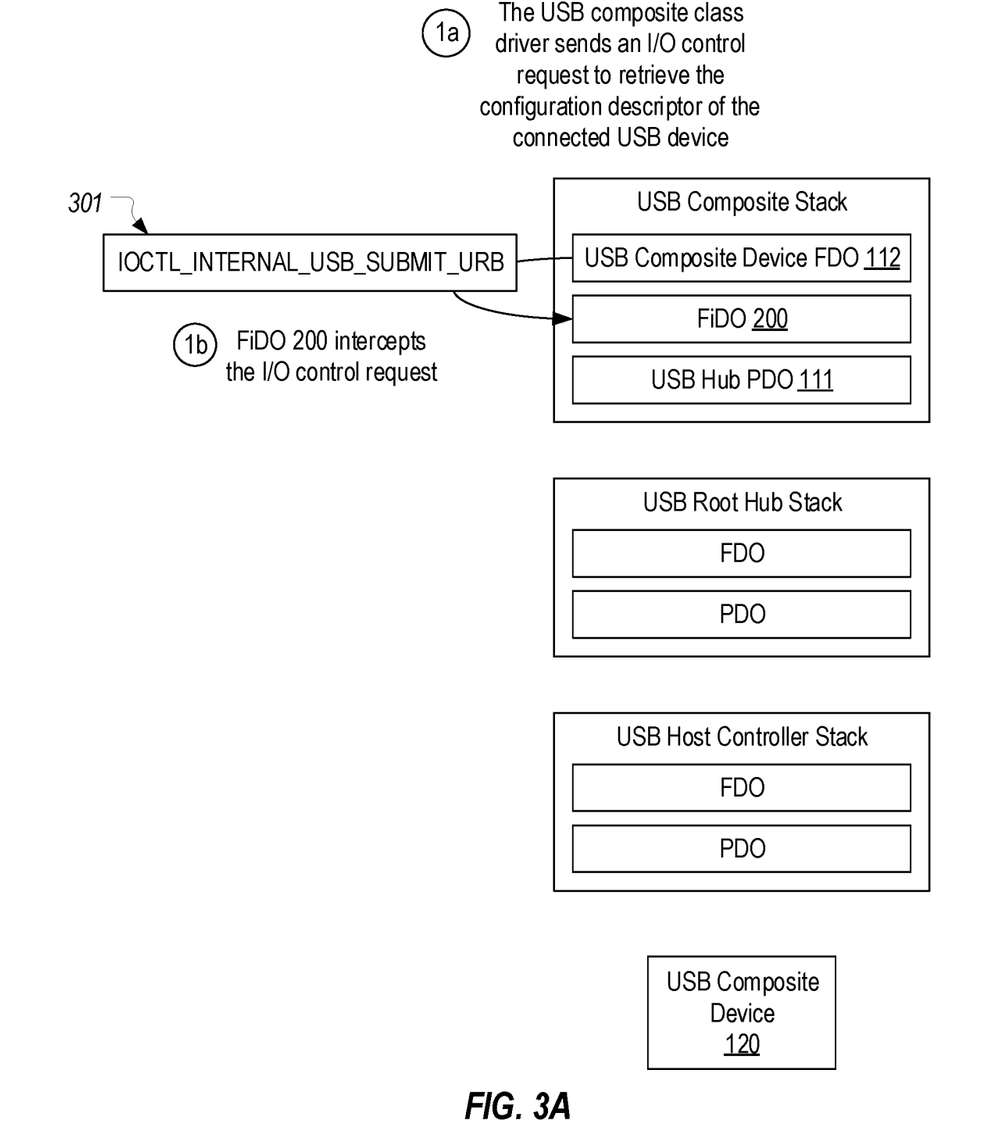
FIGS. 3A-3D provide an example of how a filter driver can determine whether a connected USB device is a USB composite device.

Turning to FIG. 3A, in step 1a, the USB composite class driver (as represented by USB composite device FDO 112) is shown as passing an I/O control request 301 (which may be in the form of an I/O request packet (IRP)) down the device stack. I/O control request 301 is assumed to be a request for the configuration descriptor(s) of USB composite device 120. In Windows implementations, a driver would submit this type of request to the USB hub (or bus) driver in the form of an IOCTL_INTERNAL_USB_SUBMIT_URB I/O control request which targets USB hub PDO 111. However, as represented by step 1b, because FiDO 200 is loaded on top of USB hub PDO 111, FiDO 200 will receive I/O control request 301 (as well as other I/O control requests that are passed down towards USB hub PDO 111) before it is passed to USB hub PDO 111.

Figure 3B:
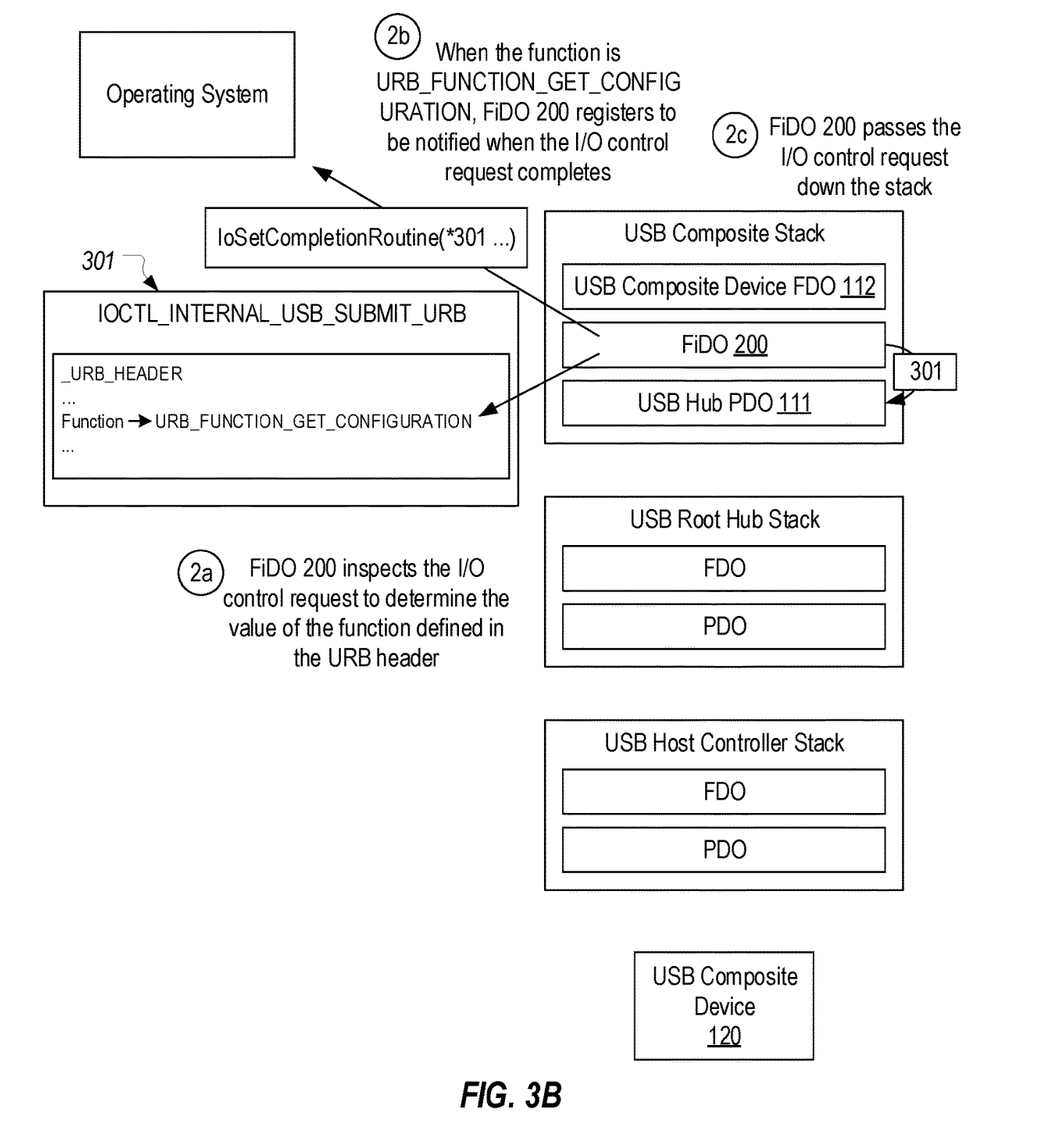

FIG. 3B illustrates the processing FiDO 200 can perform when it receives I/O control request 301. In step 2a, FiDO 200 inspects I/O control request 301 to determine the value of the function defined in the USB request block (URB) header. More particularly, FiDO 200 can access the URB contained in an input buffer that is identified within I/O control request 301 and then determine whether the function field within the URB header is set to URB_FUNCTION_GET_CONFIGURATION. If the function field is set to this value, in step 2b, FiDO 200 may register to be notified when I/O control request 301 completes (e.g., by calling IoSetCompletionRoutine with a pointer to the IRP defining I/O control request 301 and a pointer to FiDO 200's completion routine that should be called). In step 2c (which may be performed whether or not FiDO 200 registers to be notified upon completion of I/O control request 301), FiDO 200 can pass I/O control request 301 down to USB hub PDO 111.

When I/O control request 301 is passed to USB hub PDO 111, it will perform functionality to retrieve the configuration descriptor(s) and interface descriptors from USB composite device 120. These descriptors will have been stored within a buffer that I/O control request 301 references. For clarity, it is noted that the interface descriptors are retrieved as part of the configuration descriptor, and therefore, some references to configuration descriptor below should be construed as encompassing the interface descriptors.

Figure 3C:
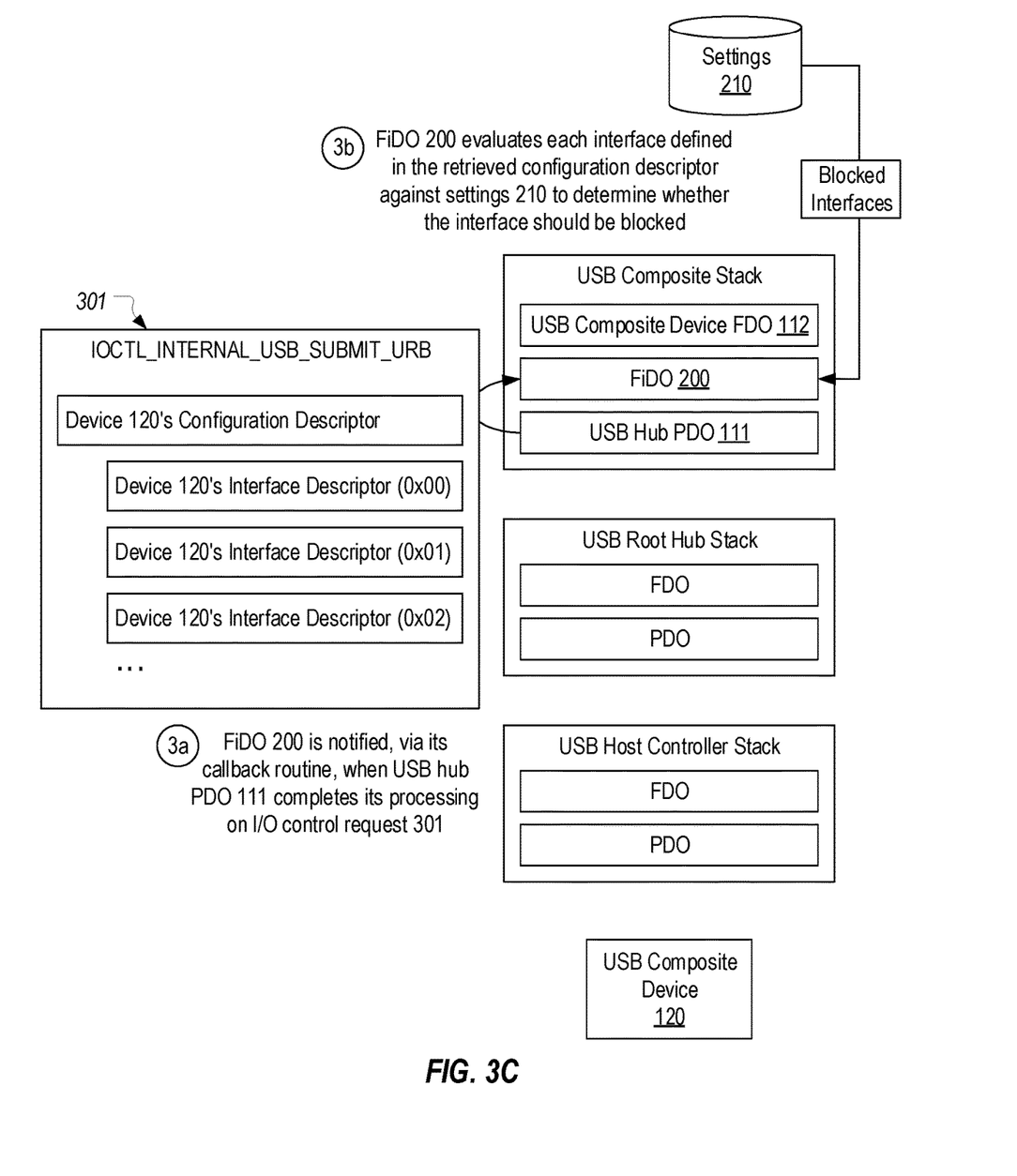

Then, as represented in step 3a of FIG. 3C, once USB hub PDO 111 has completed its handling of I/O control request 301, FiDO 200 will be notified (e.g., via the callback routine it registered in step 2b) and given control to complete its handling of the request. In conjunction with being notified of the completion of I/O control request 301, FiDO 200 can also retrieve a list of allowed interfaces (or a list of blocked interfaces) from settings 210 (or otherwise determine which interfaces should be allowed/blocked). Then, in step 3b, FiDO 200 can compare each interface descriptor identified in I/O control request 301 against the list of allowed (or blocked) interfaces to determine whether the interface descriptor and possibly the configuration descriptor should be modified to prevent the corresponding interface from being enumerated. For example, settings 210 could define blocked interfaces using any combination of class, subclass and/or protocol. In such a case, FiDO 200 could determine whether the values of the bInterfaceClass, bInterfaceSubClass and/or bInterfaceProtocol fields within the interface descriptor match the corresponding field(s) of a blocked interface defined in settings 210.

Figure 3D:
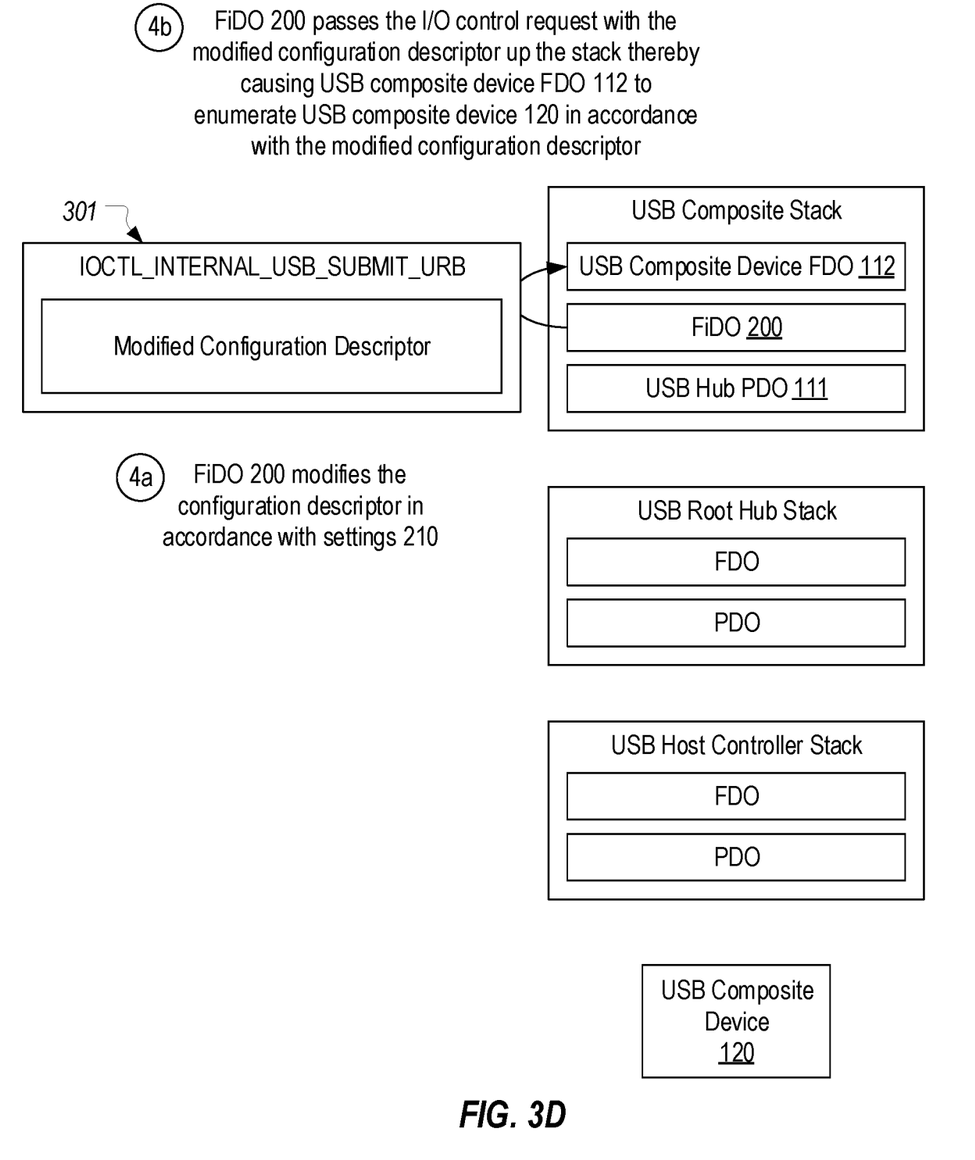

In step 4a shown in FIG. 3D, FiDO 200 can modify the configuration descriptor, including any interface descriptor, in accordance with settings 210. Then, in step 4b, FiDO 200 can pass I/O control request 301, with the modified configuration descriptor, up the stack to USB composite device FDO 112. In other words, FiDO 200 can modify I/O control request 301 in a manner that prevents USB composite device FDO 112 from enumerating an interface that should be blocked. The manner in which FiDO may modify the configuration descriptor will vary based on, among possibly other things, the number of interfaces that USB composite device 120 has and the number of these interfaces that should be blocked.

Figure 4A:
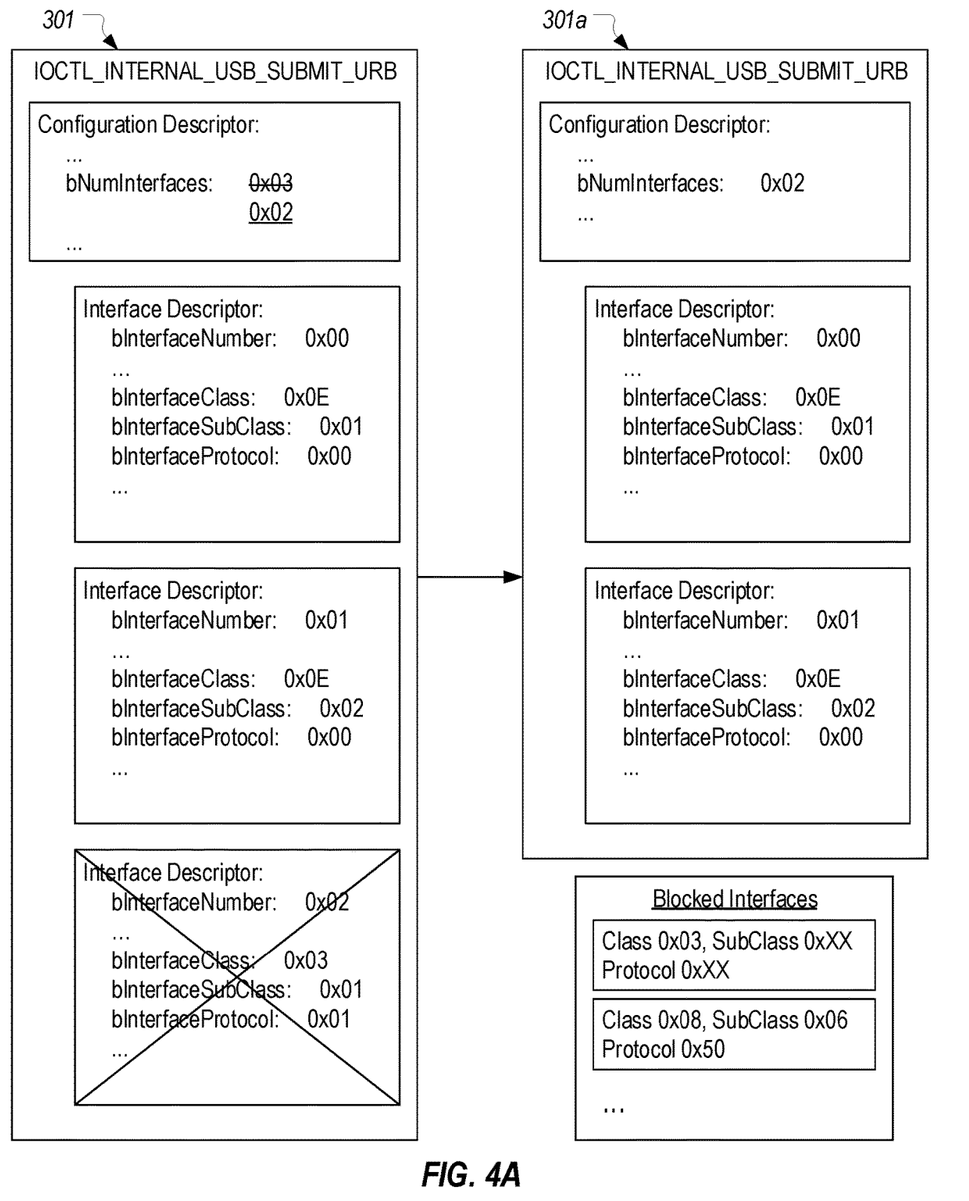
FIGS. 4A and 4B provide examples of how a filter driver can modify a configuration descriptor to selectively block interfaces of a USB composite device.
Figure 4B:
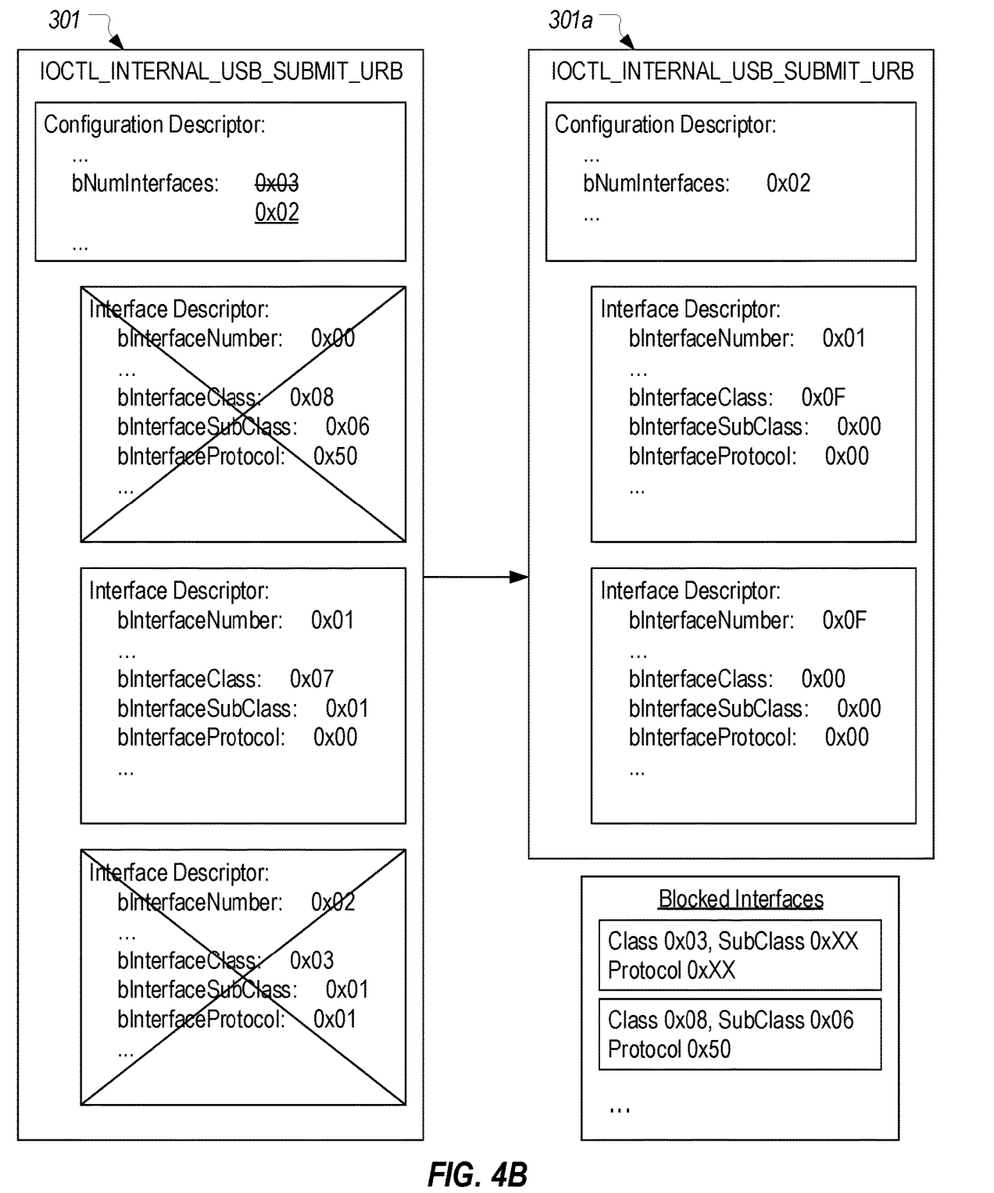

FIGS. 4A and 4B illustrate two ways in which FiDO 200 may modify a configuration descriptor. FIG. 4A represents how FiDO 200 can modify a configuration descriptor of a USB composite device when at least one of the device's interfaces should be blocked but two or more of the device's interfaces should be allowed. In other words, FIG. 4A represents the scenario were at least two interfaces remain.

In FIG. 4A, it is assumed that the completed I/O control request 301 passed to FiDO 200 includes a configuration descriptor having three interfaces (0x03) where interface 0x00 has a Class of 0x0E, a SubClass of 0x01 and a Protocol of 0x00, interface 0x01 has a Class of 0x0E, a SubClass of 0x02 and a Protocol of 0x00 and interface 0x02 has a Class of 0x03, a SubClass of 0x01 and a Protocol of 0x01. It is also assumed, as represented in FIG. 4A, that settings 210 indicate that any interface of Class 0x03 should be blocked and an interface of Class 0x08, SubClass 0x06 and Protocol 0x50 should be blocked.

Accordingly, in this example, FiDO 200 will determine that interface 0x02 should be blocked because it has a Class of 0x03. To accomplish this blocking while still allowing the unblocked interfaces to be enumerated, FiDO 200 can remove the interface descriptor for interface number 0x02 from the configuration descriptor and also update the bNumInterfaces field of the configuration descriptor from 0x03 to 0x02. As a result, the modified version 301a of I/O control request 301, which will be passed to USB composite device FDO 112, will report that USB composite device 120 has two interfaces, rather than the three that it actually has. USB composite device FDO 112 would then enumerate and build device stacks only for the two reported interfaces.

FIG. 4B represents how FiDO 200 can modify a configuration descriptor of a USB composite device when at least one of the device's interfaces should be blocked and only one of the device's interfaces should be allowed. In other words, FIG. 4B represents the scenario were only one interface remains.

In FIG. 4B, it is assumed that the completed I/O control request 301 passed to FiDO 200 again includes a configuration descriptor having three interfaces (0x03) where interface 0x00 has a Class of 0x08, a SubClass of 0x06 and a Protocol of 0x50, interface 0x01 has a Class of 0x07, a SubClass of 0x01 and a Protocol of 0x00 and interface 0x02 has a Class of 0x03, a SubClass of 0x01 and a Protocol of 0x01. Accordingly, in this example, FiDO 200 will determine that interface 0x00 should be blocked because it has a Class of 0x08, a SubClass of 0x06 and a Protocol of 0x50 and that interface 0x02 should be blocked because it has a Class of 0x03. To accomplish this blocking while still allowing the single unblocked interface to be enumerated, FiDO 200 can remove the interface descriptors for interface numbers 0x00 and 0x02. However, doing so leaves a single interface descriptor—i.e., it creates a configuration descriptor that is invalid for a composite device.

To address this issue, FiDO 200 can create a "dummy" interface descriptor to add to the single remaining interface descriptor so that there are two interface descriptors. FiDO 200 can create this dummy interface descriptor by setting the bInterfaceNumber of an interface descriptor to a valid, yet non-existent value (e.g., a value that exceeds the number of interfaces that was originally reported). Given that USB composite devices likely do not have 15 interfaces, the value of 0x0F shown in FIG. 4B would typically be sufficient. In this example, because the originally reported configuration descriptor included 3 interfaces, FiDO 200 can also update the bNumInterfaces field to 0x02. However, such an update would not be necessary if the originally reported configuration descriptor had included 2 interfaces. Accordingly, in this scenario, FiDO 200 removes one or more interface descriptors, adds a dummy interface descriptor and may, if necessary, update the number of interfaces in the configuration descriptor. As a result, the modified version 301a of I/O control request 301, which will be passed to USB composite device FDO 112, will report that USB composite device 120 has two interfaces, rather than the three that it actually has. USB composite device FDO 112 would then enumerate and build a device stack for the one legitimate interface.

For the sake of completeness, it is noted that, in the above-described processes, FiDO 200 could recreate the entire block of data representing the configuration descriptor. As is known, the configuration descriptor, interface descriptors and endpoint descriptors that would be retrieved by I/O control request 301 are stored in a buffer in sequential/contiguous fashion. The removal of one or more interface descriptors may therefore require recombining the data into a contiguous block, calculating the size of the recombined block and updating the bTotalLength field of the configuration descriptor among possibly other updates. However, the present invention should not be limited to any particular way in which FiDO 200 creates a modified configuration descriptor.

This process can be performed whenever a USB composite device is newly connected so that only allowed interfaces will be enumerated. Additionally, if a change is made to settings at runtime, agent 220 could cause the process to be performed even after the USB composite device has been connected and enumerated. For example, agent 220 could send FiDO 200 a request to cycle or reset the USB port that USB hub PDO 111 manages (e.g., via a control device object). This cycle or reset will cause the enumeration process to be repeated thereby allowing FiDO 200 to immediately address any changes in the settings that govern allowed interfaces as opposed to having those changes applied only after the USB composite device is physically disconnected and reconnected or after the host system is restarted.

There may be cases where all interfaces of a USB composite device should be blocked. In such cases, it could be possible to remove all interface descriptors from the configuration descriptor and replace them with multiple dummy interface descriptors. However, this could result in unpredictable behavior. To address these cases, in some embodiments of the present invention, FiDO 200 may be configured to monitor for IOCTL_INTERNAL_USB_SUBMIT_URB I/O control requests which target USB hub PDO 111 and which specify URB_FUNCTION_GET_DESCRIPTOR_FROM_DEVICE as the function of the URB header. Such IOCTLs would typically be sent by the plug and play subsystem to determine which FDO to load for the USB device. For example, when the targeted USB device is a USB composite device, these IOCTLs would be sent before USB composite device FDO 112 is loaded.

When such IOCTLs are detected, FiDO 200 can register a completion routine to enable it to inspect and, if appropriate, modify the device descriptor that these IOCTLs retrieve. As part of this completion routine, FiDO 200 can determine whether the USB device is a USB composite device and, if so, query USB hub PDO 111 to retrieve the configuration descriptor for the USB composite device. Once FiDO 200 retrieves the configuration descriptor, it can perform steps similar to steps 3a and 3b in FIG. 3C to determine whether all of the interfaces should be blocked. If all of the interfaces should be blocked, FiDO 200 can modify the device descriptor to include valid but non-existent values and then complete the IOCTL. As a result, the modified device descriptor reported to the plug and play subsystem will not represent a USB composite device (or any actual USB device) which should prevent the loading of a FDO for the USB device. Notably, FiDO 200's modification of the device descriptor will prevent USB composite device FDO 112 from being loaded for the USB device and likewise will prevent USB composite device FDO 112 from enumerating the interfaces of the USB device.

In contrast, if FiDO 200 determines that not all of the interfaces of the USB composite device should be blocked (or that the USB device is not a USB composite device), it can simply complete the IOCTL without modifying the device descriptor. If the targeted USB device is a USB composite device, USB composite device FDO 112 will be loaded and will initiate the process represented in FIGS.

3A-3D to thereby allow FiDO 200 to block individual interfaces of the USB composite device.

Figure 5:
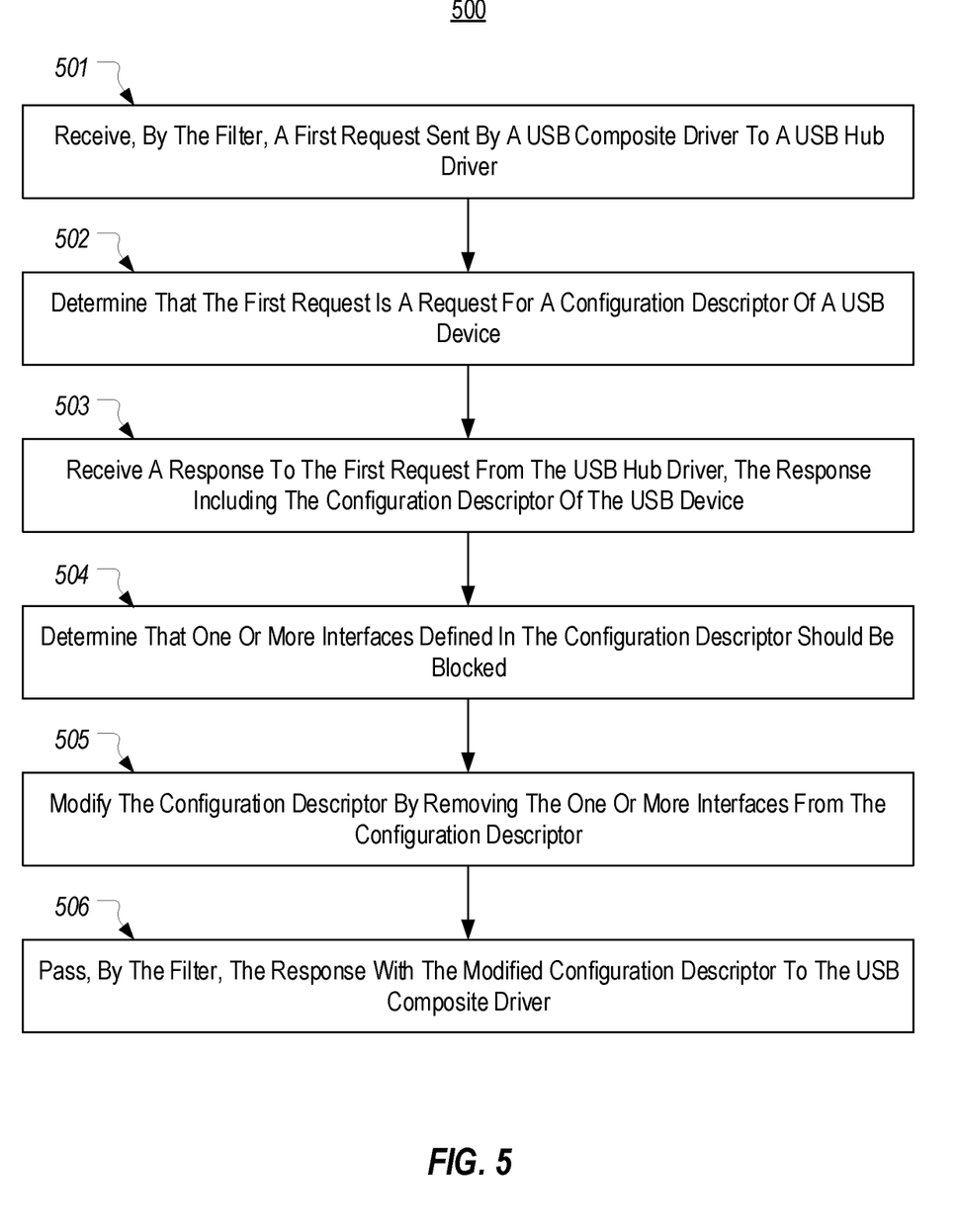
FIG. 5 provides a flowchart of an example method for locking down individual interfaces of USB composite devices.

FIG. 5 provides a flowchart of an example method 500 for blocking individual interfaces of USB composite devices. Method 500 can be performed by a filter that includes FiDO 200 and that may be associated with agent 220.

Method 500 includes an act 501 of receiving, by the filter, a first request sent by a USB composite driver to a USB hub driver. For example, FiDO 200 can intercept I/O control request 301.

Method 500 includes an act 502 of determining that the first request is a request for a configuration descriptor of a USB device. For example FiDO 200 may determine that I/O control request 301 includes an URB with the URB header set to URB_FUNCTION_GET_CONFIGURATION.

Method 500 includes an act 503 of receiving a response to the first request from the USB hub driver, the response including the configuration descriptor of the USB device. For example, FiDO 200 can receive I/O control request 301 after it has been handled by USB hub PDO 111.

Method 500 includes an act 504 of determining that one or more interfaces defined in the configuration descriptor should be blocked. For example, FiDO 200 may compare content of the interface descriptors contained in I/O control request 301 to settings 210.

Method 500 includes an act 505 of modifying the configuration descriptor by removing the one or more interfaces from the configuration descriptor. For example, FiDO 200 may remove one or more interface descriptors from the configuration descriptor contained in I/O control request 301.

Method 500 includes an act 506 of passing, by the filter, the response with the modified configuration descriptor to the USB composite driver. For example, FiDO 200 may pass I/O control request 301 up to USB composite device FDO 112.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a filter, for blocking individual interfaces of USB composite devices, the method comprising:

receiving, by the filter, a first request sent by a USB composite driver to a USB hub driver;

determining that the first request is a request for a configuration descriptor of a USB device;

receiving a response to the first request from the USB hub driver, the response including the configuration descriptor of the USB device;

determining that one or more interfaces defined in the configuration descriptor should be blocked;

modifying the configuration descriptor by removing the one or more interfaces from the configuration descriptor; and passing, by the filter, the response with the modified configuration descriptor to the USB composite driver.

2. The method of claim 1, wherein the filter comprises a filter device object that is attached to a physical device object of the USB hub driver.

3. The method of claim 1, wherein the first request is an I/O control request that submits a USB request block to the USB hub driver.

4. The method of claim 1, further comprising:

registering a completion routine in response to determining that the first request is a request for the configuration descriptor of the USB device, and wherein the response to the first request from the USB hub driver is received in the completion routine.

5. The method of claim 1, wherein determining that one or more interfaces defined in the configuration descriptor should be blocked comprises accessing one or more settings which define interfaces that should be allowed or that should be blocked.

6. The method of claim 1, wherein the configuration descriptor defines at least three interfaces and, after removing the one or more interfaces, the modified configuration descriptor defines at least two interfaces, wherein modifying the configuration descriptor further comprises updating a number of interfaces defined in the configuration descriptor.

7. The method of claim 1, wherein, after removing the one or more interfaces, the modified configuration descriptor defines one interface, wherein modifying the configuration descriptor further comprises adding a dummy interface to the modified configuration descriptor.

8. The method of claim 7, wherein adding the dummy interface comprises adding an interface descriptor that has an interface number that is set to a valid but non-existent value.

9. The method of claim 7, wherein modifying the configuration descriptor further comprises updating a number of interfaces defined in the configuration descriptor.

10. The method of claim 1, further comprising:
receiving, by the filter, a second request sent to the USB hub driver;
determining that the second request is a request for a device descriptor of a second USB device;
receiving a second response to the second request from the USB hub driver, the second response including the device descriptor of the second USB device;
determining that the second USB device is a USB composite device and that all interfaces of the USB composite device should be blocked; and
modifying the device descriptor to prevent the USB composite driver from being loaded for the second USB device.

11. The method of claim 1, further comprising:
causing, by an agent associated with the filter, a power cycle of a USB port that the USB hub driver manages, wherein the filter receives the first request after the agent causes the power cycle of the USB port.

12. The method of claim 11, wherein the agent causes the power cycle of the USB port in response to changes in settings which define interfaces that should be blocked.

13. One or more computer storage media storing computer executable instructions which when executed implement a method for blocking individual interfaces of USB composite devices, the method comprising:
attaching a filter device object to a USB hub physical device object;
receiving, at the filter device object, a USB request block that targets the USB hub physical device object and that requests a configuration descriptor of a USB device;
causing, by the filter device object, the USB request block to be provided to the filter device object after the USB hub physical device object has obtained the configuration descriptor of the USB device;
obtaining, at the filter device object, the configuration descriptor of the USB device from the USB request block;
determining that one or more interfaces defined in the configuration descriptor should be blocked;
modifying the configuration descriptor by removing the one or more interfaces from the configuration descriptor; and
passing, by the filter, the USB request block with the modified configuration descriptor to a USB composite driver.

14. The computer storage media of claim 13, wherein the configuration descriptor defines at least three interfaces and, after removing the one or more interfaces, the modified configuration descriptor defines at least two interfaces, wherein modifying the configuration descriptor further comprises updating a number of interfaces defined in the configuration descriptor.

15. The computer storage media of claim 13, wherein, after removing the one or more interfaces, the modified configuration descriptor defines one interface, wherein modifying the configuration descriptor further comprises adding a dummy interface to the modified configuration descriptor.

16. The computer storage media of claim 15, wherein modifying the configuration descriptor further comprises updating a number of interfaces defined in the configuration descriptor.

17. The computer storage media of claim 13, wherein the method further comprises:
receiving, at the filter device object, a second USB request block that targets the USB hub physical device object and that requests a device descriptor of a second USB device;
causing, by the filter device object, the second USB request block to be provided to the filter device object after the USB hub physical device object has obtained the device descriptor of the second USB device;
obtaining, at the filter device object, the device descriptor of the second USB device from the second USB request block;
determining that the second USB device is a USB composite device and that all interfaces of the USB composite device should be blocked; and
modifying the device descriptor to prevent the USB composite driver from being loaded for the second USB device.

18. A method, performed by a filter, for blocking individual interfaces of USB composite devices, the method comprising:
receiving, by the filter and from a USB hub driver, a response that includes a configuration descriptor of a USB device, the response targeting a USB composite driver;
determining that one or more interfaces defined in the configuration descriptor should be blocked;
modifying the configuration descriptor by removing the one or more interfaces from the configuration descriptor; and
passing, by the filter, the response with the modified configuration descriptor to the USB composite driver.

19. The method of claim 18, wherein the configuration descriptor defines at least three interfaces and, after removing the one or more interfaces, the modified configuration descriptor defines at least two interfaces, wherein modifying the configuration descriptor further comprises updating a number of interfaces defined in the configuration descriptor.

20. The method of claim 18, wherein, after removing the one or more interfaces, the modified configuration descriptor defines one interface, wherein modifying the configuration descriptor further comprises adding a dummy interface to the modified configuration descriptor.

* * * * *